US009959662B2

(12) United States Patent
Mitchell et al.

(10) Patent No.: US 9,959,662 B2
(45) Date of Patent: May 1, 2018

(54) SIMULATION AND SKINNING OF HETEROGENEOUS TEXTURE DETAIL DEFORMATION

(71) Applicant: Disney Enterprises, Inc., Burbank, CA (US)

(72) Inventors: Kenneth John Mitchell, Earlston (GB); Charalampos Koniaris, Edinburgh (GB); Darren Cosker, Bath (GB)

(73) Assignee: Disney Enterprises, Inc., Burbank, CA (US)

( * ) Notice: Subject to any disclaimer, the term of this patent is extended or adjusted under 35 U.S.C. 154(b) by 595 days.

(21) Appl. No.: 14/537,798

(22) Filed: Nov. 10, 2014

(65) Prior Publication Data

US 2016/0133040 A1  May 12, 2016

(51) Int. Cl.
 *G06T 13/20* (2011.01)
 *G06T 15/04* (2011.01)
(52) U.S. Cl.
 CPC .............. *G06T 15/04* (2013.01); *G06T 13/20* (2013.01); *G06T 2210/36* (2013.01); *G06T 2210/44* (2013.01)
(58) Field of Classification Search
 None
 See application file for complete search history.

(56) References Cited

U.S. PATENT DOCUMENTS

| 6,072,496 | A  | * | 6/2000 | Guenter | G06K 9/00201 345/419 |
|---|---|---|---|---|---|
| 2016/0035142 | A1 | * | 2/2016 | Nair | G06T 19/20 345/420 |

OTHER PUBLICATIONS

Sorkine-Hornung, O, Wimmer, M. Simulation and skinning of heterogeneous texture detail deformation. Eurographics, 2015, 1-13, vol. 34, (2).
Ben-Chen, M., Weber, O., and Gotsman, 2009. Variational harmonic maps for space deformation. ACM Transactions on Graphics (TOG), vol. 28, ACM, 34.
Botsch, M., and Sorkine, O. 2008. On linear variational surface deformation methods. Visualization and Computer Graphics, IEEE Transactions on 14, 1, 213-230.
Burley, B., and Lacewell, D. 2008. Ptex: Per-face texture mapping for production rendering. In Computer Graphics Forum, vol. 27, Wiley Online Library, 1155-1164.
Floater, M., and Hormann, K. 2005. Surface parameterization: a tutorial and survey. Advances in multiresolution for geometric modelling, 157-186.

(Continued)

*Primary Examiner* — James A Thompson
(74) *Attorney, Agent, or Firm* — Sheppard Mullin Richter & Hampton

(57) ABSTRACT

A method is disclosed for reducing distortions introduced by deformation of a surface with an existing parameterization. In an exemplary embodiment, the method comprises receiving a rest pose mesh comprising a plurality of faces, a rigidity map corresponding to the rest pose mesh, and a deformed pose mesh; using the rigidity map to generate a simulation grid on the rest pose mesh, the simulation grid comprising a plurality of cells; defining a set of constraints on the simulation grid, the constraints being derived at least in part from the rigidity map; running a simulation using the simulation grid and the set of constraints to obtain a warped grid; and texture mapping the deformed pose mesh based on data from the warped grid.

19 Claims, 6 Drawing Sheets

(56) References Cited

OTHER PUBLICATIONS

Gal, R., Sorkine, O., and Cohen-Or, D. 2006. Featureaware texturing. Proceedings of Eurographics Symposium on Rendering, 297-303.
Heckbert, P. 1986. Survey of texture mapping. Computer Graphics and Applications, IEEE 6, 11, 56-67.
Hormann, K. L'E Vy, B., Sheffer, A., et al. 2007. Mesh parameterization: Theory and practice. SIGGRAPH Course Notes.
Jacobson, A., Baran, I., Popovic, J., and Sorkine, O. 2011. Bounded biharmonic weights for real-time deformation. SIGGRAPH'11: ACM SIGGRAPH 2011 Papers.
Jin, Y., Shi, Z. Sun, J., Huang, J., and Tong, R. 2013. Content-aware texture mapping. Graphical Models.
Joshi, P., Meyer, M., Derose, T., Green, B., and Sanocki, T. 2007. Harmonic coordinates for character articulation. ACM Transactions on Graphics (TOG) 26, 3, 71.
Ju, T., Schaefer, S., and Warren, J. 2005. Mean value coordinates for closed triangular meshes. In ACM Transactions on Graphics (TOG), vol. 24, ACM, 561-566.
Koniaris, C., Cosker, D., Yang, X., Mitchell, K., and Matthews, I. 2013. Real-time content-aware texturing for deformable surfaces. In Proceedings of the 10th European Conference on Visual Media Production, ACM, New York, NY, USA, CVMP '13,11:1-11:10.
Kraevoy, V., Sheffer, A., Shamir, A., and Cohen-Or, D. 2008. Non-homogeneous resizing of complex models. In ACM Transactions on Graphics (TOG), vol. 27, ACM, 111.
Lipman, Y., Levin, D. and Cohen-Or, 2008. Green coordinates. ACM Transactions on Graphics (TOG), vol. D. 27, ACM, 78.
Maillot, J., Yahia, H., and Verroust, A. 1993. Interactive texture mapping. Proceedings of the 20th annual conference on Computer graphics and interactive techniques, ACM, 27-34.
Müller, M., Heidelberger, B., Hennix, M., and Ratcliff, J. 2007. Position based dynamics. Journal of Visual Communication and Image Representation 18, 2, 109-118.
Müller, M. 2008. Hierarchical position based dynamics. VRIPHYS 8, 1-10.
Panozzo, D., Weber, O., and Sorkine, O. 2012. Robust image retargeting via axis-aligned deformation. In Computer Graphics Forum, vol. 31, Wiley Online Library, 229-236.
Popa, T., Julius, D., and Sheffer, A. 2006. Material-aware mesh deformations. In Shape Modeling and Applications, 2006. SMI 2006. IEEE International Conference on, IEEE, 22-22.
Sander, P., Gortler, S., Snyder, J., and Hoppe, H. 2002. Signal-specialized parametrization. In Proceedings of the 13th Eurographics workshop on Rendering, Eurographics Association, 87-98.
Sheffer, A., and De Sturler, E. 2002. Smoothing an overlay rid to minimize linear distortion in texture mapping. ACM Transactions on Graphics (TOG) 21, 4, 874-890.
Sheffer, A., Praun, E., and Rose, K. 2006. Mesh parameterization methods and their applications. Foundations and Trends R in Computer Graphics and Vision 2, 2, 105-171.
Xu, W., and Zhou, K. 2009. Gradient domain mesh deformation—a survey. Journal of computer science and technology 24, 1, 6-18.
Yang, X., Southern, R. and Zhang, J. 2009. Fast simulation of skin sliding. Computer Animation and Virtual Worlds 20, 2-3, 333-342.
Yë U Cer, K., Jacobson, A., Hornung, A., and Sorkine, O. 2012. Transfusive image manipulation. ACM Transactions on Graphics (TOG) 31, 6, 176.
Falco R., Driskill H.: Inverse Texture Warping. SIGGRAPH' 02: ACM SIGGRAPH 2002 Papers (2002).
Hormann et al., Mesh parameterization: Theory and practice, SIGGRAPH Course Notes, Aug. 2007, Chapters 1-7, pp. 1-58.
Hormann et al., Mesh parameterization: Theory and practice, SIGGRAPH Course Notes, Aug. 2007, Chapters 8-10, pp. 59-115.
Sorkine, O., Laplacian mesh processing, Eurographics State-of-the-Art Report, 2005, pp. 53-70.

* cited by examiner

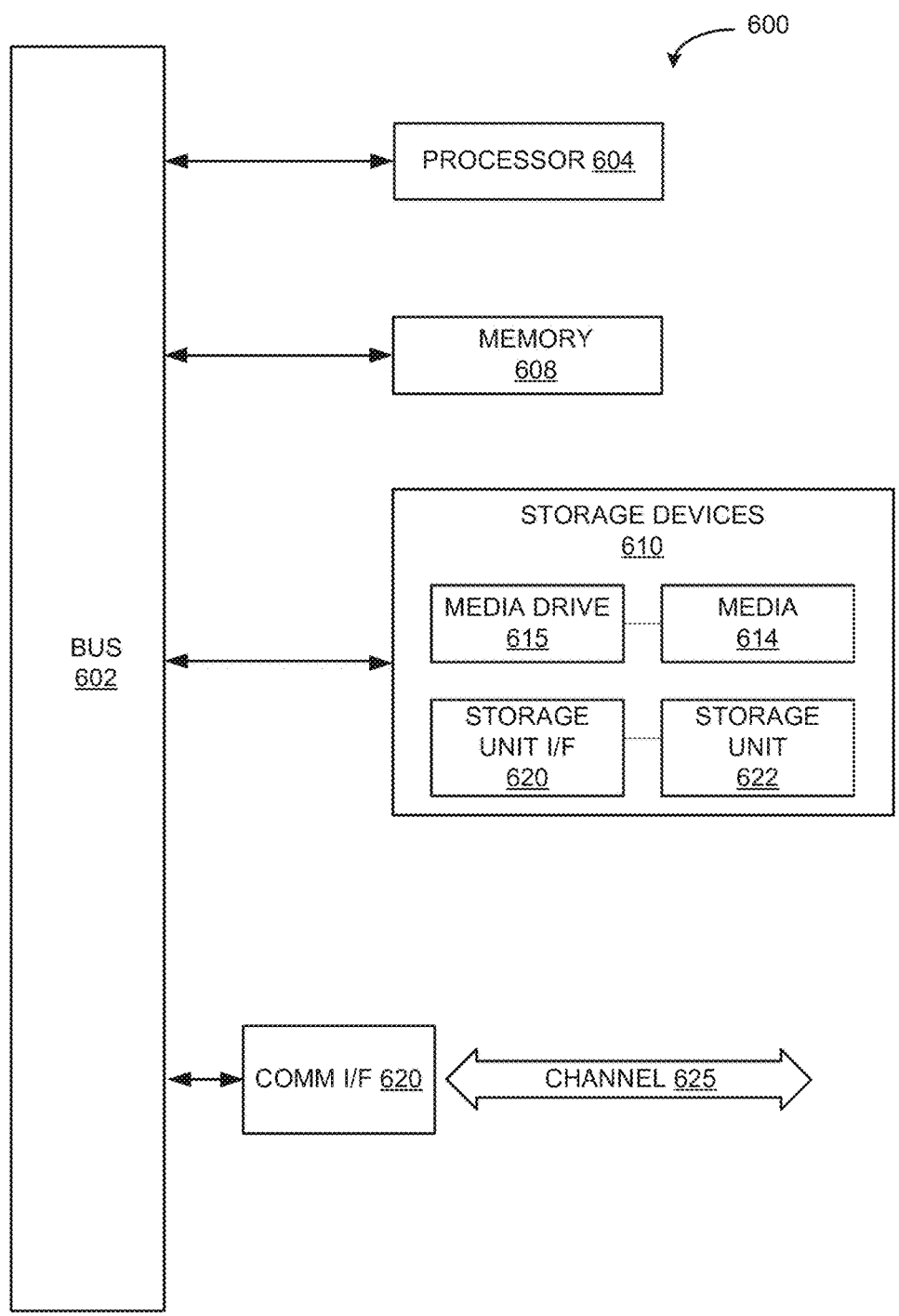

SIMULATION AND SKINNING OF HETEROGENEOUS TEXTURE DETAIL DEFORMATION

TECHNICAL FIELD

The present disclosure relates generally to computer animation, and, more particularly, to a method for minimizing distortions introduced by deformation of a surface.

DESCRIPTION OF THE RELATED ART

Texture mapping is the process of mapping detail (e.g., color, bump or displacement) to a surface using a corresponding parameterisation—the most common case being a 2D parameterisation of a 3D surface. Some representations have natural parameterisations (e.g. NURBS), while others, such as polygonal meshes, require non-trivial methods or manual input to obtain parameterisations. In the case of polygonal meshes, parameterisations are represented in the same way as vertices: as piecewise-linear approximations to continuous functions. A metric for the quality of a parameterization is the distortion introduced by the mapping.

BRIEF SUMMARY OF THE DISCLOSURE

The present disclosure introduces a novel method to reduce distortions caused by the deformation of a parameterised surface in real-time. This allows a variety of texture-mapped detail to be applied to an animated model without it undergoing visually undesirable behaviors.

The present disclosure may be embodied in a method, comprising: receiving a rest pose mesh comprising a plurality of faces, a rigidity map corresponding to the rest pose mesh, and a deformed pose mesh; using the rigidity map to generate a simulation grid on the rest pose mesh, the simulation grid comprising a plurality of cells; defining a set of constraints on the simulation grid, the constraints being derived at least in part from the rigidity map; running a simulation using the simulation grid and the set of constraints to obtain a warped grid; and texture mapping the deformed pose mesh based on data from the warped grid.

In one aspect, the defined rest pose mesh may be a quad mesh such that each of the plurality of faces is a quadrilateral.

In another aspect, the rigidity map may comprise a plurality of rigidity values representing the rigidity of various points on the rest pose mesh.

In a more particular embodiment, running the simulation may comprise calculating a warped parameterisation for one or more of the plurality of faces, the one or more of the plurality of faces defining a simulated faces subset.

In one aspect of this embodiment, the method may further comprise marking each edge of each face contained in the simulated faces subset with one of three states: a first state indicating that the marked edge borders a face that will not be simulated, or does not border a face at all; a second state indicating that the marked edge borders a face that has already been simulated; and a third state indicating that the marked edge borders a face that will be simulated later.

The set of constraints may comprise edge length constraints and area constraints. The plurality of cells may be quadrilaterals, and the edge length constraints may comprise constraints on all edges of the simulation grid and the diagonals of each cell, and the area constraints may comprise constraints on the triangulation of the simulation grid, the triangulation comprising two triangles per cell.

Running the simulation may comprise using modified position based dynamics to run the simulation.

The simulation may be a hierarchical simulation, such that running the simulation comprises: constructing a lower resolution simulation grid from the simulation grid; running a first simulation on the lower resolution simulation grid; and running a second simulation on the simulation grid using the results of the first simulation. In a more particular aspect of this embodiment, the lower resolution simulation grid may be constructed from the simulation grid by reducing the number of cells by half in each dimension.

The method may further comprise approximating the data from the warped grid, wherein, texture mapping the deformed pose mesh comprises texture mapping the deformed pose mesh based on the approximation of the data from the warped grid.

The disclosure may also embodied in a non-transitory computer readable medium comprising an instruction set configured to cause a computing device to perform the disclosed method.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 6 illustrates an example computing module that may be used in implementing various features of embodiments of the methods described herein.

DETAILED DESCRIPTION

Figure 1:
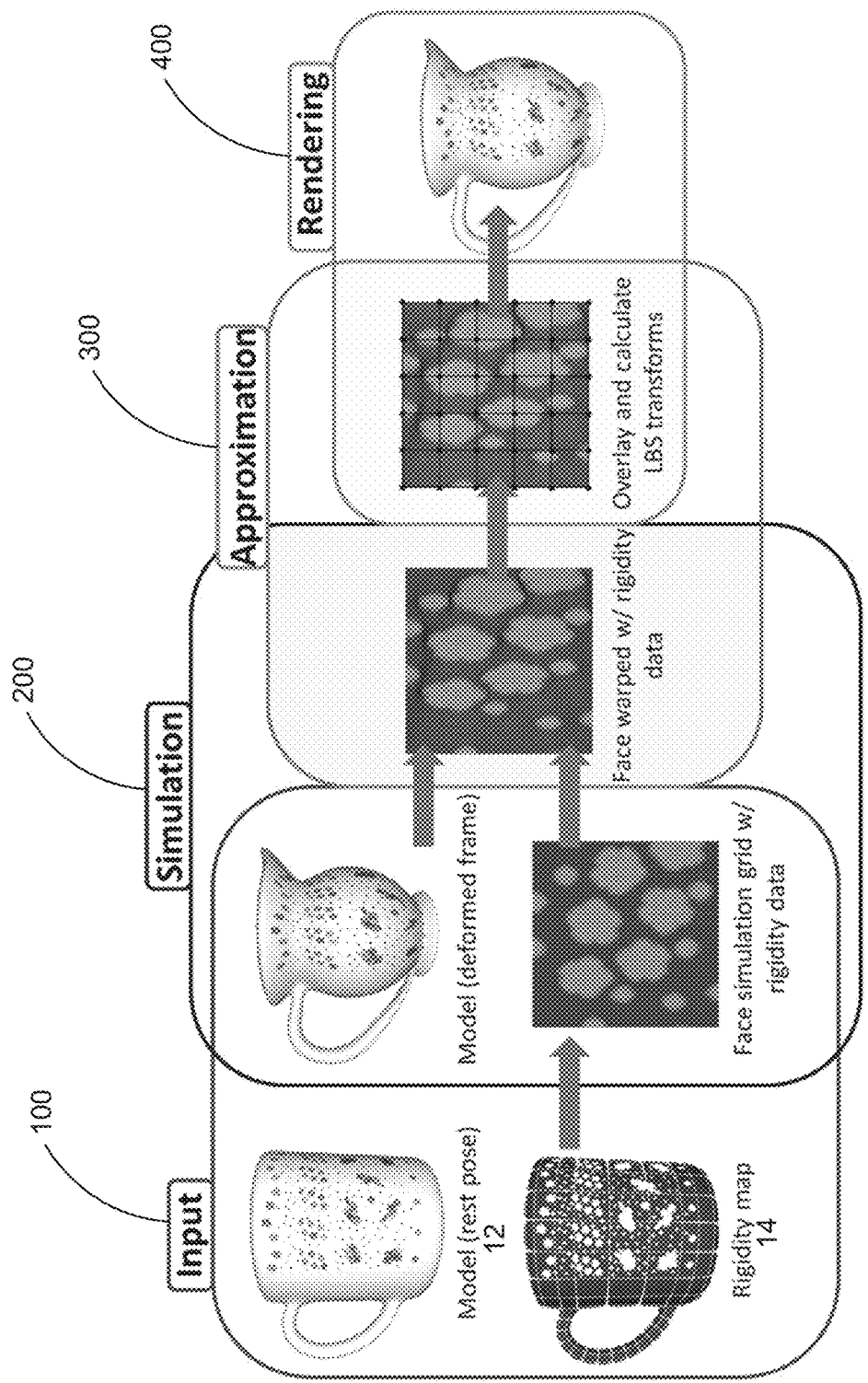
FIG. 1 provides an overview of an exemplary method by which to minimize deformations, in accordance with an embodiment of the present disclosure.

In a typical scenario, when creating a 3D model an artist will model low complexity geometry and paint texture, displacement or bump maps according to a specific mesh pose (e.g. a rest position) to simulate high complexity geometric detail. This data is stored using the 2D parameterisation. Given the piecewise linear nature of the parameterisation and its low complexity, subsequent animation or editing of such meshes via a non-Euclidean transform will result in undesirable distortions in the mapped detail (e.g. elastic stretching or squashing behavior). While some surfaces may require this property (e.g. skin, rubber), it is preferable to be able to control the degree of elasticity or restrict certain elements to remain entirely rigid (e.g. horns, armor elements and scales). While physical simulations may be employed to approximate this behavior, these are typically not appropriate for real-time animation and interactive editing. Therefore, to reduce this type of distortion using presently available methods, either the parameterisation needs to be regenerated, additional detail maps must be authored for key poses, or the mesh needs to be manually edited, all of which are either time or labor-intensive, or both.

Animation of models often introduces distortions to their parameterisation, as these are typically optimized for a single frame. For example, an artist will typically sculpt a mesh at its rest pose and then create texture map, bump map and displacement map detail specific for that configuration. Surface material can be significantly heterogeneous in terms of desired deformation properties, which can be local to specific parts of the model. The net effect is that under deformation, mapped features may appear to stretch or scale in an undesirable way. The present disclosure provides a technique to reduce such distortions by calculating in reatime content-aware, per-face dense warps based on distortion control (rigidity) maps. The dense warps are then approximated using a new, highly efficient Linear Blend Skinning (LBS) approach with implicit weights. This significantly reduces storage costs and allows the warps to be played back in real-time, but much faster than running the simulation. The result is real-time dynamic content-aware per-face texture mapping that reduces distortions in a controlled way. The technique can be applied in a variety of scenarios where a textured mesh with salient fine-scale detail of heterogeneous elasticity deforms, and the mesh topology needs to remain constant. Examples include: 1) coarse mesh animations using different textures, such as video game characters; 2) procedural, time varying salient detail mapped on animated models; and 3) artist deforming a textured mesh with mapped detail of heterogeneous elasticity.

1. Introduction

The majority of existing algorithms that minimize parameterisation distortions apply such metrics to the whole domain, thus not taking into account the nature of the data being mapped. In addition to not being usable for heterogeneous data (i.e., different texture elasticity levels in different mesh areas) and being intended for offline use, they do not consider temporal coherence of solutions in the case of deformable objects. Previous methods focus on global texture space preservation, require complex models, do not handle deformations of textured models, or are not intended for interactive or real-time rates. In contrast, the presently disclosed method provides distortion control of texture space deformations in flexible user-specified areas, re-uses the coarse model used for animation and allows real-time simulation and playback of highly complex, per-pixel warps. These characteristics make it ideal for cases where the mesh topology needs to remain unchanged and storage requirements can be an issue. The disclosed method requires no pre-training other than creation of the simple distortion map in addition to other texture detail.

2. Real-Time Content Aware Deformation

This section discloses an overview of an exemplary embodiment of the presently disclosed method. For purposes of description and illustration, it is assumed that the input is a rest-pose quad mesh $M_O$ together with relevant detail—texture, displacement and/or bump maps. Additional inputs may consist of a distortion or rigidity map R and a selection of faces $F_M$. Given this initial data, a new mesh target position $M_D$ is assumed. This can be provided by an animated sequence of meshes, or a new mesh resulting from a manual edit of the original mesh by an artist.

One goal under deformation of a mesh from time t to t+1 is to warp the mesh parameterisation in chosen quadrilateral faces in order to reduce distortion artifacts caused by the deformation in a content-aware way. This is accomplished by calculating the per-face warps by deforming regular, finely-tessellated grids over the chosen faces in the parameterisation. This allows adjacent faces to be independently solved using a well-defined set of warping domain rules.

Another goal is to approximate these dense deformed grids with LBS transformations; which may be required because the warp data can be impractically large for real-time applications.

An overview of the disclosed method 10 is provided in FIG. 1. The method 10 comprises an input step 100, a simulation step 200, an approximation step 300, and a rendering step 400. Given a mesh (rest pose and animation) and texture, a rigidity map is defined for the faces that will be processed (input, section 2.1). The rigidity map is used to generate a fine regular grid (at map resolution) that serves as the simulation mesh. Constraints are defined over this simulation mesh, whose stiffnesses are directly derived from the rigidity map. The maps and mesh data are then used by the disclosed optimization process to hierarchically calculate the per-face warped parameterisation domains (simulation, sections 2.2 and 2.3). The resulting dense, deformed grids are approximated with the disclosed efficient LBS approach (approximation, section 2.4). The animated mesh, the texture and LBS data are used to render the dynamically warped texture (rendering, section 2.5). Each of these steps will be described in greater detail in the sections that follow.

2.1 Input: Rigidity Map Definition

As can be seen in FIG. 1, the method 10 comprises an input step 100. In this step, a rest pose model 12 is input, along with a corresponding rigidity map 14.

Rigidity maps 14 may be defined artistically, procedurally, or derived from existing texture data. The maps represent how resistant the material is to stretching at any given point, and are thus able to simulate the deformation resistance of multiple types of surface detail, e.g., rubber, skin, wood, scales, depending on the model created by the artist. In an exemplary embodiment, these maps 14 store values in the range [0,1], representing completely elastic to completely rigid materials respectively. FIGS. 2 and 3 show various example deformations with different degrees of rigidity, including complex continuous (grey level) distortion maps.

Figure 2B:
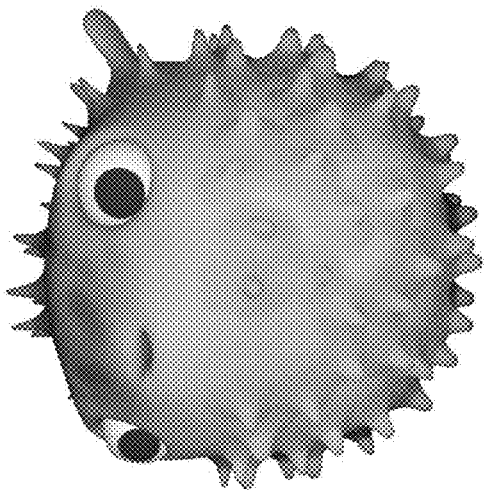
FIG. 2B provides the blowfish animation model of FIG. 2A in a deformed pose without remapping.
Figure 2C:
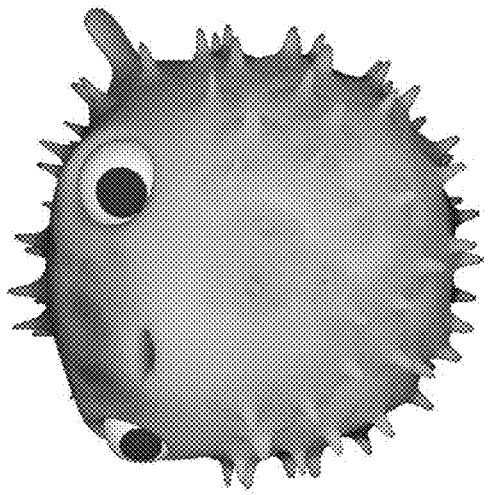
FIG. 2C provides the blowfish animation model of FIG. 2A in a deformed pose with remapping.
Figure 2A:
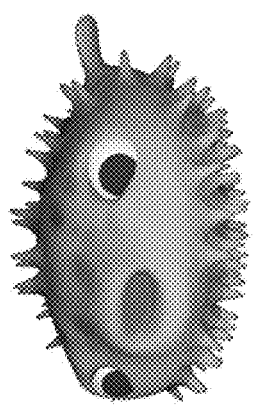
FIG. 2A provides a blowfish animation model in a rest pose.
Figure 2D:
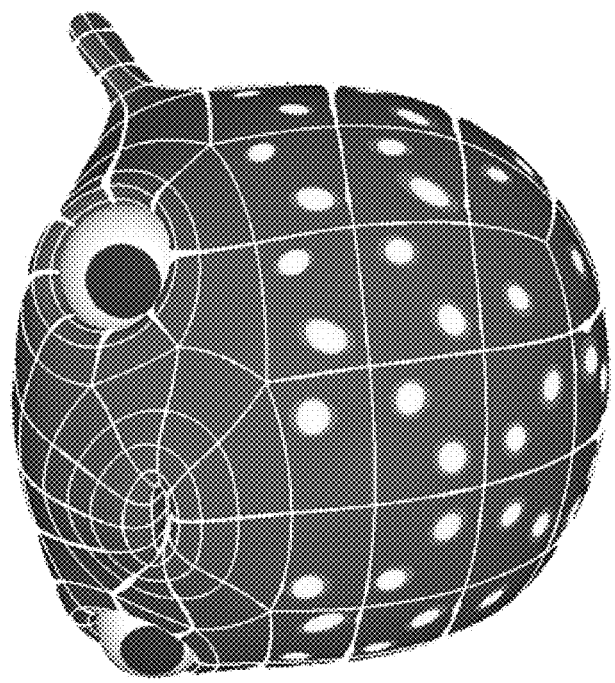
FIG. 2D provides an overlapped comparison of the deformed pose models of FIGS. 2B and 2C.
Figure 3C:
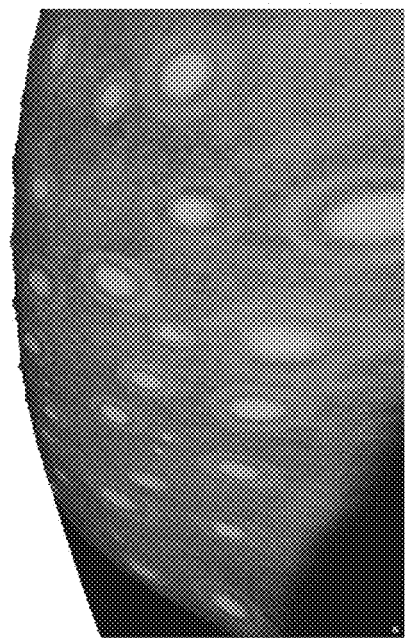
FIG. 3C provides a close up distortion map of the T-Rex model of FIG. 3A in a deformed pose without remapping.
Figure 3D:
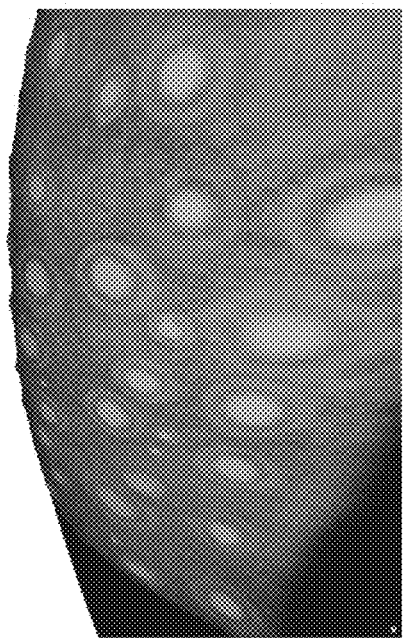
FIG. 3D provides a close up distortion map of the T-Rex model of FIG. 3A in a deformed pose with remapping.
Figure 3A:
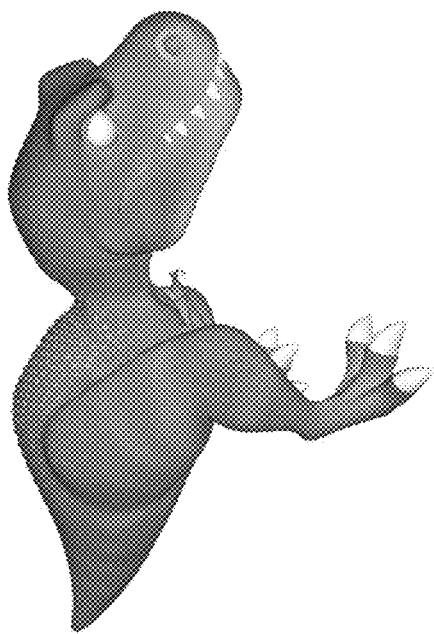
FIG. 3A provides a T-Rex animation model in a rest pose.
Figure 3B:
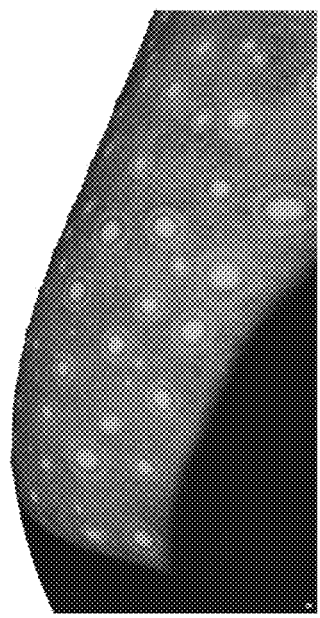
FIG. 3B provides a close up distortion map of the T-Rex model of FIG. 3A.

In FIG. 2A, a rest pose of a blowfish animation is provided. The blowfish texture contains spikes which we wish to remain rigid. FIG. 2B provides a deformed pose in which the spikes have not been made rigid. It can be seen that the spikes on the blowfish have obtained a round-ish character and have not remained rigid. FIG. 2C provides the same deformed pose as FIG. 2B, but with the spikes being given greater rigidity via a rigidity map. It can be seen by comparing FIGS. 2B and 2C that the spikes in FIG. 2C maintain their narrow shape, while the spikes in FIG. 2B have been undesirably distorted. FIG. 2D provides an overlap of the corrected and uncorrected features, where it can be shown that the correct features remain narrow (white circles) and the uncorrected features have been distorted (gray circles expanding around the white circles).

Similar benefits can be seen in FIG. 3, which uses a T-Rex animation example. FIG. 3A provides the T-Rex animation in rest pose. FIG. 3B provides a close up grey-scale distortion map to view the details of the T-Rex animation. FIG. 3C shows a deformed pose without use of a rigidity map. It can be seen that the circular features are deformed and elongated. In FIG. 3D, the same deformed pose is shown with corrections made based on the rigidity map to keep the features of the T-Rex rigid.

The disclosed method does not require any form of pre-processing on the rigidities, and as such, it is perfectly possible to use different rigidity maps for different animation frames.

2.2 Warping Domain Strategy

Before describing minimization and fast warping strategy in detail, warping strategy will first be discussed. This balances independent processing of faces with edge-wise information sharing such that details between seams are preserved. Warping a selection of faces allows us to focus warping optimization on specific regions, improving the efficiency of the process. Additionally, warping per-face has several other benefits:

Localized warps. Small scale detail (which are one focus of the present disclosure) can move within a face but not over the borders. As such, global drifts are avoided as a side-effect, while local sliding is allowed so as to optimize use of space.

Can be used with Ptex. The warp is contained within the parameterization of a face and as such there is no bleeding of detail of other faces in or out.

Simpler calculations. Smaller optimization domain results in fewer calculations.

Parallelizable calculations. Faces can be optimized in parallel as long as they are not adjacent.

Efficient localized edits. In an interactive editing scenario, when a vertex moves, only the adjacent faces that share the vertex need to be simulated.

Face selection heuristics. Any heuristic can be applied per-face to determine the quality of the simulation and if simulation is needed at all, e.g., distance from camera, culling etc.

As warps are calculated per face, it should be ensured that warps of adjacent faces match. This is accomplished by fixing the corners for all faces that are going to be simulated, and carefully handling the edges of the deformation grid.

When warping a face, each of the four edges is marked as in one of three states:

Read-only, no data (R). This state is set on edges of simulated (corrected) faces that are shared with faces that either are not going to be simulated, or simply do not exist. The edge points are fixed, and their positions linearly interpolate the corner points of the edge.

Read-only, with data ($R_D$). This state is set on edges of simulated faces that are shared with faces that have already been simulated. The edge points are fixed, and their positions linearly interpolate the appropriate edge data of the adjacent simulated faces.

Write-enabled (W). This state is set on edges of simulated faces that are shared with faces that are going to be simulated later than the current face. The edge points can be written to, with the restriction that their position lies on the edge.

Figure 4:
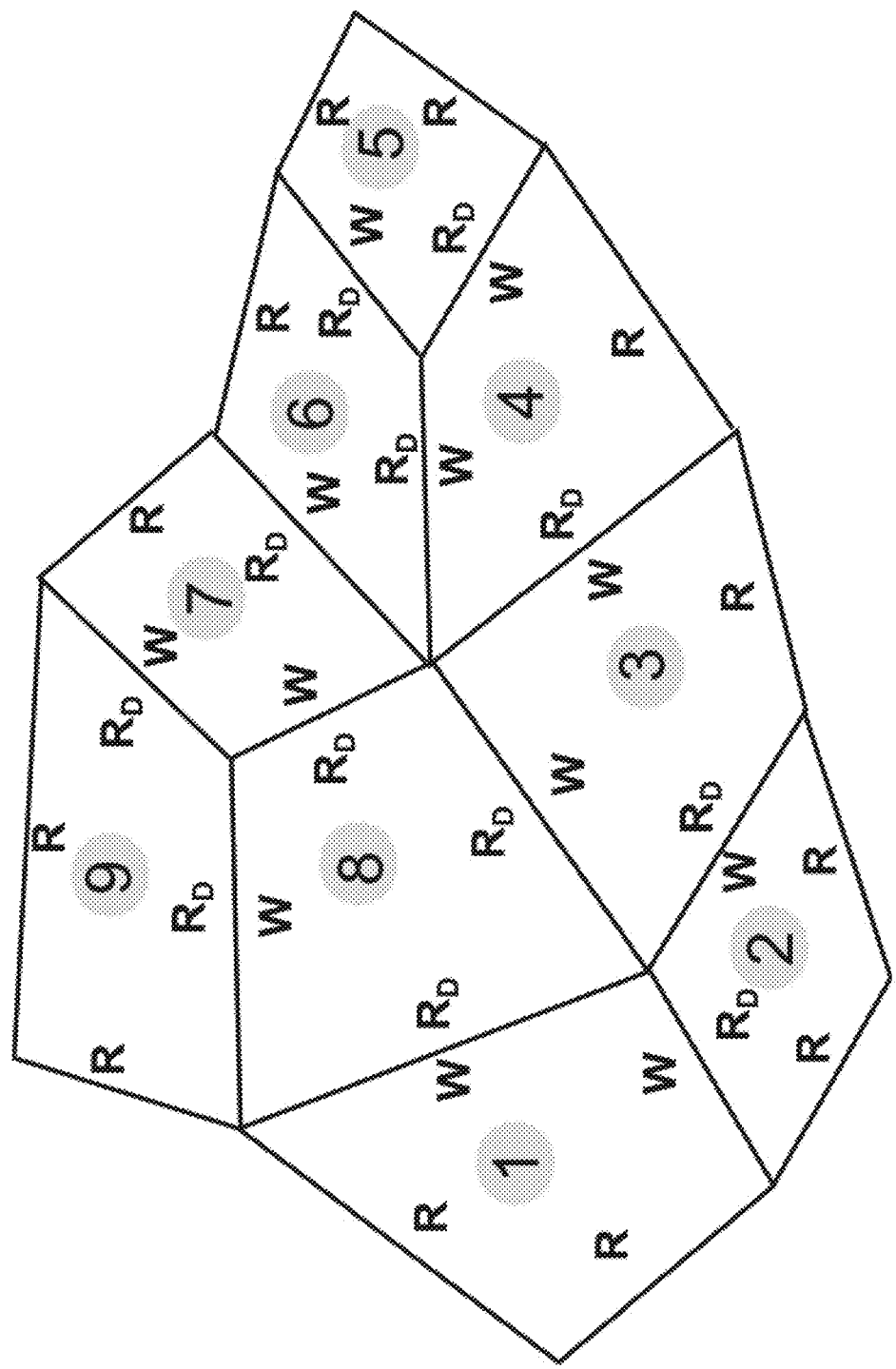
FIG. 4 provides an example of edge propagation states for each face, in accordance with an aspect of an embodiment of the present disclosure.

The process is similar to flood fill, as the edge data are propagated from neighbor to neighbor. An example of face selection and edge states is displayed in FIG. 4, which shows nine faces (1 through 9), with the number on each face representing the order of processing. The symbols on the edges of each face represent read-only without data (R), read-only with data ($R_D$), and write-enabled (W). When propagating the edge data this way, warps along edges are smooth. Naturally, the order does affect the results, as outputs of simulated faces are used as inputs in other simulated faces. Although there is no formal way to determine the best order, processing highest—"importance" faces first yields better results—importance being defined loosely as a weighted combination of amount of deformation from rest pose and amount of rigidity on a face.

The set of faces that will be simulated can be split into subsets that can be processed in parallel, resulting in greater efficiency of the method. This parallel grouping is performed by successively removing subsets of faces from the original set that do not share any edges and marking them as parallel until the original set becomes empty.

2.3 Simulation: Extended Position Based Dynamics

Referring back to FIG. 1, it can be seen that the method 10 further comprises a simulation step 200. As mentioned previously, a primary goal of the method is to warp the per-face parameterisation domain of a selection of deformed faces. This way, selected regions in these faces are kept rigid (depending on the strength of the rigidity map value at a specific point) while the rest interpolate smoothly. One distortion metric that may be used is the difference of geometric distances between two points in the original and deformed poses:

$$E(p_0,p_1)=R(p_0,p_1)(|G_D(p_0)-G_D(p_1)|-|G_0(p_0)-G_0(p_1)|) \quad \text{(Equation 1)}$$

where $p_0$, $p_1$ are two points in the parameter domain of a face, $G_D$ is the $R^2 \rightarrow R^3$ geometry function for the deformed pose and $G_0$ is the $R^2 \rightarrow R^3$ geometry function for the rest pose.

In a preferred embodiment, position based dynamics (PBD) is used to calculate the warps, as it offers two beneficial characteristics. First, it provides control over positions, which is beneficial in fixing points on the deformation grid, such as edge and corner points. It also easily handles non-linear energy functions, which are necessary when using non-linear distortion metrics.

2.3.1 PBD Process

A single PBD simulation iteration may comprise the following steps:

1. Velocity damping: Used to eliminate oscillations caused by the integration step.
2. Calculation of estimated positions: Uses an explicit Euler integration step to predict the new positions.
3. Constraint projection: Manipulates the estimated positions so that they satisfy given constraints.
4. Integration: Moves positions to optimized estimates and updates velocities accordingly.

The disclosed approach adapts the constraints and constraint projection of the PBD algorithm. In addition, given the fine tessellation of the grid used in PBD, a hierarchical strategy is described below for optimization that improves convergence and therefore overall performance of simulation.

2.3.2 Constraints & Constraint Projection

As described, the constraints of the PBD algorithm are adapted to our problem domains needs. PBD constraints are scalar functions. Two types of constraints are used in the present approach: edge length constraints and area constraints. The edge length constraints $C_E$ have a cardinality of 2 and a type of equality (i.e., the constraint function is satisfied when $C_E(p_0, p_1)=0$), and represent the distortion metric in equation 1. The signed triangle area constraints have a cardinality of 3 and a type of inequality (i.e., the constraint function is satisfied when $C_A(p_0, p_1, p_2) \geq 0$), and are used to prevent flips:

$$E(p_0, p_1, p_2) = \frac{1}{2}|(p_1 - p_0) \times (p_2 - p_0)| \geq 0 \quad \text{(Equation 2)}$$

The edge length constraints are composed of all the edges of the grid, as well as the diagonals of each cell. The triangle area constraints are composed of the triangulation of the grid (two triangles per cell). As the grid is regular, the constraint vertex indices can be stored implicitly given the grid dimensions:

$$C_{horz} = (p_{x,y}, p_{x+1,y})$$

$$C_{vert} = (p_{x,y}, p_{x,y+1})$$

$$C_{shear_0} = (p_{x,y}, p_{x+1,y+1})$$

$$C_{shear_1} = (p_{x+1,y}, p_{x,y+1})$$

where $p_{i,j}$ are the points on the 2D simulation grid.

Figure 5:
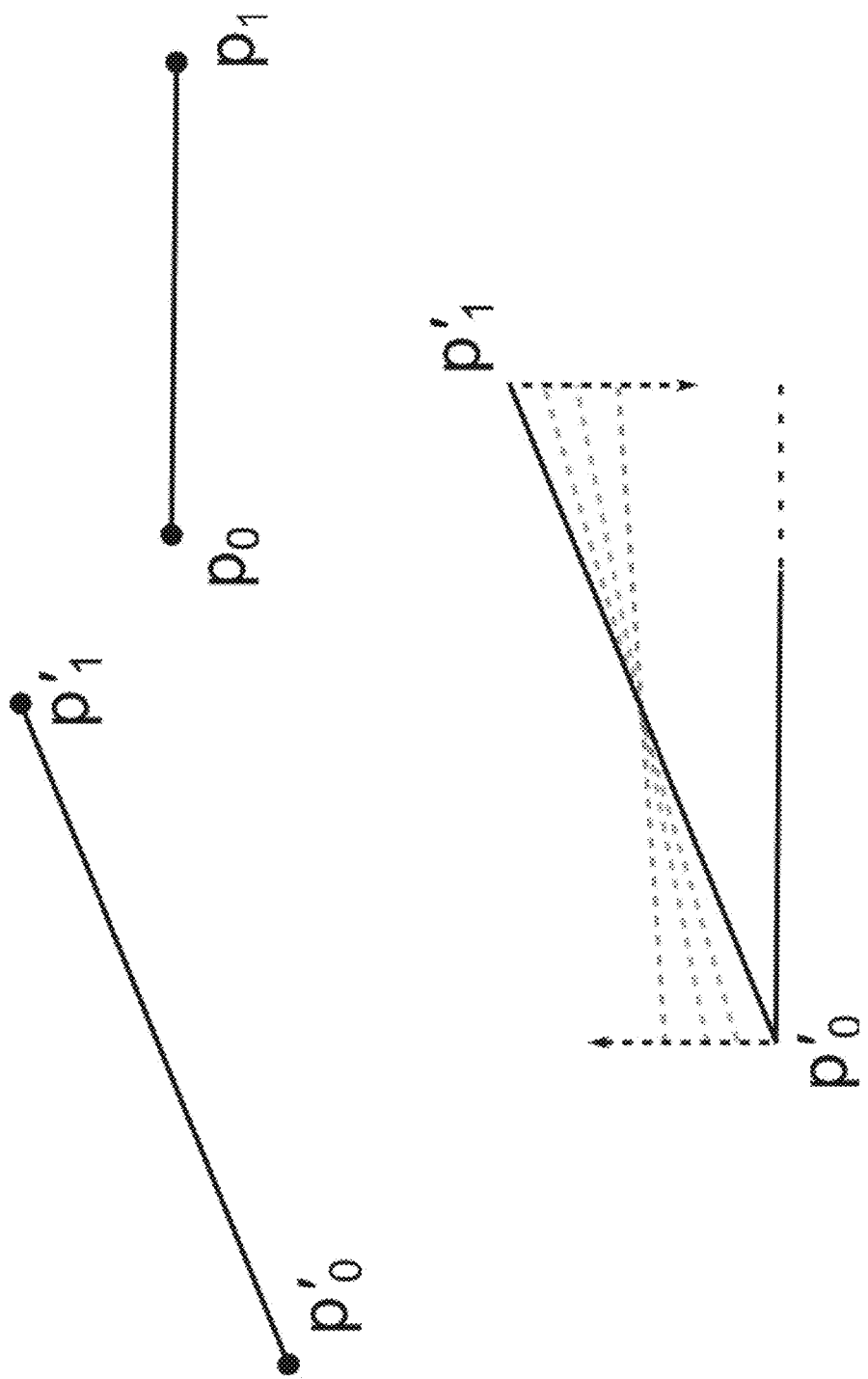
FIG. 5 demonstrates projection of constraint vertex correction to original directions, in accordance with an aspect of an embodiment of the present disclosure.

For the edge length constraints, the corrected estimated positions are calculated, with an additional extra step. Since the source is a regular grid and the result should ideally be a smooth deformation, the solution is moved towards its projection on the line extending the original point pair:

$$p_d = p_{01} \cdot p'_{01} - p'_{01} \quad \text{(Equation 3)}$$

$$p'_0 = p'_0 - w_{proj} \frac{w_1}{w_0 + w_1} p_d \quad \text{(Equation 4)}$$

$$p'_1 = p'_1 + w_{proj} \frac{w_0}{w_0 + w_1} p_d \quad \text{(Equation 5)}$$

where $p_0$, $p_1$ are points on the rest pose of the mesh, $p'_0$, $p'_1$ are points on a deformed pose of the mesh, $w_{proj} \in [0,1]$ is how much the points should be moved towards their projections on the original line and $w_0, w_1 \in [0,1]$ the stiffnesses of the points. This is shown in FIG. 5, which the original segment ($p_0$, $p_1$) and corrected segment ($p'_0$, $p'_1$) are shown on the top right and top left, respectively. On the bottom, both points $p'_0$ and $p'_1$ move so that they become closer to being parallel to the original segment.

2.3.3 Efficient Hierarchical PBD

Regular PBD on a finely tessellated grid converges slowly towards a good solution, as it takes many iterations for local effects to propagate. To counter this, a hierarchy can be used to calculate the warp in a multi-scale manner.

Given a simulation grid with $2^N \times 2^M$ cells, successively lower resolution grids can be constructed by reducing the dimension by half: $2^{N-k} \times 2^{M-k} \forall k \leq \min(N,M)$. Stiffnesses for the coarser cells can be calculated as the average of the finer cells they contain. As the grid has a power-of two resolution, vertices of all grid levels share the same fine grid:

$$p_{i,j,k} = p_2(l-k)_i, 2^{l-k}_{j,l} \quad \text{(Equation 6)}$$

where i,j are fine 2D grid coordinates and k,l are hierarchy levels, higher being finer. Constraints for the course levels are generated implicitly using equation 6.

The step that differs to the non-hierarchical version is the constraint projection step. At this step, the coarsest grid is simulated first. The results are propagated to the vertices of the next finer level and the finer level vertices are smoothed.

The propagation of coarse level k to the next finer level is calculated as:

$$p_{i,j,k+1} = \begin{cases} \frac{\sum_{a=0}^{1}\sum_{b=0}^{1} p_{\frac{i}{2}+a, \frac{j}{2}+b, k}}{4}, & \text{if}(i \text{ is odd}) \text{ and } (j \text{ is odd}) \\ \frac{\sum_{a=0}^{1} p_{\frac{i}{2}+a, \frac{j}{2}, k}}{2}, & \text{if}(i \text{ is odd}) \text{ and } (j \text{ is even}) \\ \frac{\sum_{a=0}^{1} p_{\frac{i}{2}+a, \frac{j}{2}, k}}{2}, & \text{if}(i \text{ is even}) \text{ and } (j \text{ is odd}) \\ p_{\frac{i}{2}, \frac{j}{2}, k}, & \text{otherwise} \end{cases}$$

2.4 Approximation: Fast LBS

Step 300 in FIG. 1, the approximation step, will now be discussed in greater detail.

The calculated warps can have significant storage requirements, depending on the number of simulated faces, the resolutions of the deformation grids and the number of animated frames. A typical case with 100 faces, 10 frames and 256×256 resolution for each face requires approximately 1 GB of memory. In order to solve this problem, approximation using linear blend skinning (LBS) may be used, which is simple, efficient and generates quality results.

The described LBS approach is per-face. A $M_T \times N_T$ regular grid of $R^{2 \times 3}$ transformation matrices is overlaid over the face at a desired resolution, covering the domain of the whole face. Each point on the face is then inside a cell of the transform grid, and as such the warp for that point can be expressed by bilinearly interpolating the results of transforming the point with its associated corner cell matrices.

$$p'_{u,v} = p_{u,v} + \sum_{i=0}^{1}\sum_{j=0}^{1} w_{i,j} T_{i,j} \begin{bmatrix} p_{u,v} \\ 1 \end{bmatrix}, \text{ where} \quad \text{(Equation 7)}$$

$$p_{u,v} = 2 \times 1 \text{ column vector, } u, v \in [0, 1] \quad \text{(Equation 8)}$$

$$T_{i,j} = \text{surrounding cell of transformations} \quad \text{(Equation 9)}$$

$$W_{i,j} = \text{bilinear coefficients} \quad \text{(Equation 10)}$$

The transformations are obtained by rearranging equation 7 and solving the resulting over-determined linear system:

$$\sum_{i=0}^{1}\sum_{j=0}^{1} w_{i,j} T_{i,j} \begin{bmatrix} p_{u,v} \\ 1 \end{bmatrix} = p'_{u,v} - p_{u,v} \Rightarrow \quad \text{(Equation 11)}$$

$$A_x = b \quad \text{(Equation 12)}$$

Matrix A is shared across coordinates: solving $A_x = b_x$ provides the top-row entries of the $R^{2 \times 3}$ transform matrices, and $A_x = b_y$ provides the bottom entries. Additionally, matrix A is dependent only on the rest pose parameterisation of the face (regular grid) and transformation weights, all of which are implicitly defined by the dimensions of the transformation and warp grids. As such, the normal equations $A^T A_x = A^T b$ are solved by using Cholesky decomposition to factorise $A^T A$ to a sparse lower triangular matrix L such that $A^T A = L L^T$.

A single factorisation can be used for not just calculating top and bottom entries of the transformation matrices, but more importantly, for all transformations of all warps of all faces that have equal transformation and warp grid dimensions. The equations are then efficiently solved by a double back substitution step:

$$Lx_0 = A^T b_{i_{coordinate}, i_{frame}, i_{face}}$$ (Equation 13)

$$L^T x = x_0$$ (Equation 14)

Using such approximations can reduce the storage requirements by orders of magnitude with minimal reduction in quality and by paying only a small offline calculation cost. Compared to other per-pixel LBS methods, the disclosed method does not pay the cost of storing weights or transformation indices per-pixel, while the calculation times are better due to the simplicity of the linear system.

2.5 Rendering

Finally, the rendering step 400 will be discussed in detail.

The warps obtained above can be easily applied in a rendering system that supports tessellation. In such a system, the warp is applied to the domain coordinates [0,1] of a point on a face, before these coordinates are used to evaluate geometry and/or other surface data. For the LBS approximation, the bilinear coefficients and the transformation indices are calculated at the input domain coordinates, and then the warped coordinates are calculated using equation 7. The new domain coordinates can then be used to evaluate surface data such as positions, normals, colors, displacements, etc.

To ensure crack-free rendering, remapping at edges should generate identical results. To achieve that, face adjacency information is passed in the shader. Each of the four edges of a face store: adjacent face index, adjacent face edge and adjacent face edge direction.

Given these, when a domain coordinate is remapped, a check is first performed to detect if the coordinate is on the face border. If it is, a second check is performed to detect if a neighboring face exists and has an index lower than the currently processed one. If these criteria are satisfied, the current face index and domain coordinates are replaced with the neighboring ones before they are used to evaluate surface data (geometry, normals, textures, etc.).

3 Results and Analysis

TABLE 1

Simulation results for various models.

| Faces | Frames | Warp grid | Simulation time (msec) | Simulation time, per face (msec) |
|---|---|---|---|---|
| 60 | 9 | 257 × 257 | 51 | 0.85 |
| 64 | 10 | 257 × 257 | 22 | 0.34 |
| 78 | 50 | 257 × 257 | 101 | 1.29 |
| 78 | 50 | 129 × 129 | 22 | 0.28 |

From left to right: (1) number of simulated faces,
(2) number of animation frames,
(3) warp grid size,
(4) per-frame time to calculate all warps, and
(5) time for simulation of the full hierarchy for a single face.
Note that when editing a mesh, in general only a few vertices change at any given time. The disclosed technique uses this to its advantage, as only adjacent faces need to be modified, and as such the simulation times above are worst-case scenarios where all faces change at the same time.

Table 1 shows dense warp calculation results for several exemplary models. As can be seen from the simulation times, real-time editing is possible. The total simulation times for each model occur only when mesh vertices are modified simultaneously in a frame, and so they can be regarded as worst-case simulation times. Each simulation iteration involves running approximately 70 GPU shader passes, most passes being constraint projection of a subset of the constraints that can be safely run in parallel. As such, while using the hierarchical approach significantly increases the convergence of the algorithm, an increase of the dense grid resolution has a non-negligible shader pass overhead, as can be seen by the performance difference of bottom two entries. As the process is fully in GPU memory, including transfer of edge data, there is no CPU-GPU data transfer overhead during the simulation.

TABLE 2

LBS approximation results.

| Frames | Faces | Warp grid | Xform grid | Factor | Total | Average | MSE |
|---|---|---|---|---|---|---|---|
| 9 | 60 | 257 × 257 | 10 × 10 | 6.2281e−04 | 3.9531 | .0066 | 1.9018e−06 |
|   |    |           | 20 × 20 | .0031 | 4.4219 | .0737 | 1.6695e−07 |
|   |    |           | 40 × 40 | .0440 | 8.2828 | .0138 | 3.2364e−08 |
| 10 | 64 | 257 × 257 | 10 × 10 | .0004746 | 4.4552 | .0063285 | 1.016e−06 |
|   |    |           | 20 × 20 | .0029083 | 5.131 | .0072883 | 8.7969e−08 |
|   |    |           | 40 × 40 | .03966 | 9.6104 | .013651 | 1.1556e−08 |
| 50 | 78 | 257 × 257 | 10 × 10 | .00064317 | 25.5045 | .0064114 | 8.7424e−07 |
|   |    |           | 20 × 20 | .0029083 | 28.9095 | .0072673 | 7.3659e−08 |
|   |    |           | 40 × 40 | .042833 | 55.8747 | .014046 | 2.0838e−08 |
|   |    | 129 × 129 | 10 × 10 | .00050724 | 4.4682 | .0011232 | 8.9072e−07 |
|   |    |           | 20 × 20 | .0031325 | 7.6788 | .0019303 | 1.2214e−07 |
|   |    |           | 40 × 40 | .043528 | 37.4387 | .0094114 | 6.3005e−08 |

The example input data are warp grids per face per animation frame.
Similarly, the output data are transform grids per face per animation frame.
From left to right: (1) number of frames for the animation sequence,
(2) number of faces that we have warp grids for,
(3) warp grid dimensions,
(4) transform grid dimensions,
(5) factorisation time for warp-transform grid dimension pair,
(6) total time for computing all transforms,
(7) average time to compute a single transform, and
(8) mean-squared error of approximation.
Times are in seconds.

Table 2 shows times and approximation errors of the disclosed LBS scheme. It can be seen that a good approximation can be achieved with a transformation grid resolution of less than 10% of the warp dimensions. If the simulation process is done offline and as the approximation error reduces monotonically, it is possible to calculate transformation grid dimensions (and subsequently transformations) that result in error below a certain, given threshold.

TABLE 3

Rendering times (milliseconds).

| 10 × 10 | 20 × 20 | 40 × 40 | Edge fix |
|---|---|---|---|
| .35 | .36 | .45 | .02 |
| .36 | .37 | .46 | .02 |
| .38 | .39 | .45 | .02 |

Columns 1-3 show the performance cost of applying the LBS approximation. The cost of fixing the edges to ensure crack-free rendering is listed separately in the last column.

Table 3 shows the effect of evaluating the LBS warps on performance. It can be seen that the difference in the performance hit is much smaller between 1010 and 20×20 grids rather than between 20×20 and 40×40 ones. This is expected due to the increase in calculation complexity and data size and provides insight into the tradeoff between the approximation quality and the runtime performance. The costs of fixing the edges were found to be insignificant compared to using the transformations.

5 Conclusion

The present disclosure presented a technique to re-parameterize texture space of a selection of faces on an animated model, such that important rigid features mapped on these regions are preserved when the surface deforms. The re-parameterisation may be further approximated with LBS transformation, so that run-time warping is faster with relatively low storage costs.

The data presented above further demonstrates that editing with distortion control can be achieved at real-time rates. The technique can be applied to reduce elastic distortions in animated texture-mapped surfaces that represent materials with heterogeneous deformation properties. Real-time editing means that in modeling packages, artists can deform texture-mapped surfaces without having to add extra vertices or alter the parameterisation. In offline rendering, warps can be calculated for massive datasets with scalable storage costs. In real-time rendering, different animated characters can share the base model and animations while warping per-face parameterisations according to their unique textures.

The disclosed methods and techniques may be implemented in whole or in part using software. In one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the disclosure using other computing modules or architectures.

Referring now to FIG. 6, computing module 600 may represent, for example, computing or processing capabilities found within desktop, laptop and notebook computers; hand-held computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of storage devices 610, which might include, for example, a media drive 615 and a storage unit interface 620. The media drive 615 might include a drive or other mechanism to support fixed or removable storage media 614. Storage media 614 might include, for example, a hard disk, a floppy disk, magnetic tape, cartridge, optical disk, a CD or DVD, or other fixed or removable medium that is read by, written to or accessed by media drive 615. As these examples illustrate, the storage media 614 can include a computer readable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 620. Communications interface 620 might be used to allow software and data to be transferred between computing module 600 and external devices. Examples of communications interface 620 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 620 might typically be carried on signals, which can be electronic, electromagnetic (which includes optical) or other signals capable of being exchanged by a given communications interface 620. These signals might be provided to communications interface 620 via a channel 625. This channel 625 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium" and "computer usable medium" are used to generally refer to media such as, for example, main memory 608, storage unit interface 620, storage media 614, and channel 625. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present disclosure as discussed herein.

While various embodiments of the application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A method, comprising:
receiving
a rest pose mesh comprising a plurality of faces,
a rigidity map corresponding to the rest pose mesh, and
a deformed pose mesh;
using the rigidity map to generate a simulation grid on the rest pose mesh, the simulation grid comprising a plurality of cells;
defining a set of constraints on the simulation grid, the constraints being derived at least in part from the rigidity map;
running a simulation using the simulation grid and the set of constraints to obtain a warped grid; and
texture mapping the deformed pose mesh based on data from the warped grid;
wherein the set of constraints comprise edge length constraints and area constraints, and wherein the plurality of cells are quadrilaterals, and the edge length constraints comprise constraints on all edges of the simulation grid and the diagonals of each cell.

2. The method of claim 1, wherein, the defined rest pose mesh is a quad mesh such that each of the plurality of faces is a quadrilateral.

3. The method of claim 1, wherein, the rigidity map comprises a plurality of rigidity values representing the rigidity of various points on the rest pose mesh.

4. The method of claim 1, wherein, the plurality of cells are quadrilaterals, and the area constraints comprise constraints on the triangulation of the simulation grid, the triangulation comprising two triangles per cell.

5. The method of claim 1, wherein running the simulation comprises using modified position based dynamics to run the simulation.

6. The method of claim 1, further comprising approximating the data from the warped grid, wherein,
texture mapping the deformed pose mesh comprises texture mapping the deformed pose mesh based on the approximation of the data from the warped grid.

7. A method, comprising:
receiving
a rest pose mesh comprising a plurality of faces,
a rigidity map corresponding to the rest pose mesh, and
a deformed pose mesh;
using the rigidity map to generate a simulation grid on the rest pose mesh, the simulation grid comprising a plurality of cells;
defining a set of constraints on the simulation grid, the constraints being derived at least in part from the rigidity map;
running a simulation using the simulation grid and the set of constraints to obtain a warped grid;
texture mapping the deformed pose mesh based on data from the warped grid; and
marking each edge of each face contained in the simulated faces subset with one of three states:
a first state indicating that the marked edge borders a face that will not be simulated, or does not border a face at all;
a second state indicating that the marked edge borders a face that has already been simulated; and
a third state indicating that the marked edge borders a face that will be simulated later.

8. A method, comprising:
receiving
a rest pose mesh comprising a plurality of faces,
a rigidity map corresponding to the rest pose mesh, and
a deformed pose mesh;
using the rigidity map to generate a simulation grid on the rest pose mesh, the simulation grid comprising a plurality of cells;
defining a set of constraints on the simulation grid, the constraints being derived at least in part from the rigidity map;
running a simulation using the simulation grid and the set of constraints to obtain a warped grid; and
texture mapping the deformed pose mesh based on data from the warped grid;
wherein the simulation is a hierarchical simulation, such that running the simulation comprises:
constructing a lower resolution simulation grid from the simulation grid;
running a first simulation on the lower resolution simulation grid; and
running a second simulation on the simulation grid using the results of the first simulation.

9. The method of claim 8, wherein the lower resolution simulation grid is constructed from the simulation grid by reducing the number of cells by half in each dimension.

10. A non-transitory computer readable medium comprising an instruction set configured to cause a computing device to perform:
receiving
a rest pose mesh comprising a plurality of faces,
a rigidity map corresponding to the rest pose mesh, and
a deformed pose mesh;
using the rigidity map to generate a simulation grid on the rest pose mesh, the simulation grid comprising a plurality of cells;
defining a set of constraints on the simulation grid, the constraints being derived at least in part from the rigidity map;
running a simulation using the simulation grid and the set of constraints to obtain a warped grid; and
texture mapping the deformed pose mesh based on data from the warped grid;
wherein the set of constraints comprise edge length constraints and area constraints, and wherein the plurality of cells are quadrilaterals, and the edge length constraints comprise constraints on all edges of the simulation grid and the diagonals of each cell.

11. The non-transitory computer readable medium of claim 10, wherein, the defined rest pose mesh is a quad mesh such that each of the plurality of faces is a quadrilateral.

12. The non-transitory computer readable medium of claim 10, wherein, the rigidity map comprises a plurality of rigidity values representing the rigidity of various points on the rest pose mesh.

13. The non-transitory computer readable medium of claim 10, wherein, running the simulation comprises calculating a warped parameterisation for one or more of the plurality of faces, the one or more of the plurality of faces defining a simulated faces subset.

14. The non-transitory computer readable medium of claim 10, wherein, the plurality of cells are quadrilaterals, and the area constraints comprise constraints on the triangulation of the simulation grid, the triangulation comprising two triangles per cell.

15. The non-transitory computer readable medium of claim 10, wherein running the simulation comprises using modified position based dynamics to run the simulation.

16. The non-transitory computer readable medium of claim 10, further comprising approximating the data from the warped grid,
wherein, texture mapping the deformed pose mesh comprises texture mapping the deformed pose mesh based on the approximation of the data from the warped grid.

17. A non-transitory computer readable medium comprising an instruction set configured to cause a computing device to perform:
receiving
a rest pose mesh comprising a plurality of faces,
a rigidity map corresponding to the rest pose mesh, and
a deformed pose mesh;
using the rigidity map to generate a simulation grid on the rest pose mesh, the simulation grid comprising a plurality of cells;
defining a set of constraints on the simulation grid, the constraints being derived at least in part from the rigidity map;
running a simulation using the simulation grid and the set of constraints to obtain a warped grid;
texture mapping the deformed pose mesh based on data from the warped grid; and
marking each edge of each face contained in the simulated faces subset with one of three states:
a first state indicating that the marked edge borders a face that will not be simulated, or does not border a face at all;
a second state indicating that the marked edge borders a face that has already been simulated; and
a third state indicating that the marked edge borders a face that will be simulated later.

18. A non-transitory computer readable medium comprising an instruction set configured to cause a computing device to perform:

receiving
- a rest pose mesh comprising a plurality of faces,
- a rigidity map corresponding to the rest pose mesh, and
- a deformed pose mesh;

using the rigidity map to generate a simulation grid on the rest pose mesh, the simulation grid comprising a plurality of cells;

defining a set of constraints on the simulation grid, the constraints being derived at least in part from the rigidity map;

running a simulation using the simulation grid and the set of constraints to obtain a warped grid; and texture mapping the deformed pose mesh based on data from the warped grid;

wherein the simulation is a hierarchical simulation, such that running the simulation comprises:
- constructing a lower resolution simulation grid from the simulation grid;
- running a first simulation on the lower resolution simulation grid; and
- running a second simulation on the simulation grid using the results of the first simulation.

19. The non-transitory computer readable medium of claim 18, wherein the lower resolution simulation grid is constructed from the simulation grid by reducing the number of cells by half in each dimension.

\* \* \* \* \*